United States Patent
Liu (10) Patent No.: US 9,256,313 B2
(45) Date of Patent: Feb. 9, 2016

(54) TOUCH POINT DETECTING DEVICE AND THE TOUCH POINT DETECTING METHOD THEREOF

(75) Inventor: Yong Liu, Singapore (SG)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 713 days.

(21) Appl. No.: 13/211,331

(22) Filed: Aug. 17, 2011

(65) Prior Publication Data

US 2012/0299842 A1 Nov. 29, 2012

(30) Foreign Application Priority Data

May 28, 2011 (CN) .......................... 2011 1 0152534

(51) Int. Cl.
*G06F 3/041* (2006.01)
*G06F 3/044* (2006.01)

(52) U.S. Cl.
CPC .............. *G06F 3/0416* (2013.01); *G06F 3/044* (2013.01); *G06F 3/0418* (2013.01)

(58) Field of Classification Search
CPC .................. G06F 3/033; G06F 3/0488; G06F 2203/04104; G06F 2203/04108; G06F 3/03547; G06F 3/041; G06F 3/044; G06F 3/045
USPC .............................. 345/173; 178/18.01–20.04
See application file for complete search history.

(56) References Cited

U.S. PATENT DOCUMENTS

| | | | |
|---|---|---|---|
| 7,439,962 B2 | 10/2008 | Reynolds et al. | |
| 2003/0028346 A1 | 2/2003 | Sinclair et al. | |
| 2007/0257890 A1 | 11/2007 | Hotelling et al. | |
| 2008/0157893 A1 | 7/2008 | Krah | |
| 2008/0158169 A1* | 7/2008 | O'Connor et al. | 345/173 |
| 2008/0252608 A1* | 10/2008 | Geaghan | 345/173 |
| 2009/0127003 A1 | 5/2009 | Geaghan | |
| 2010/0060589 A1 | 3/2010 | Wilson | |
| 2010/0127992 A1* | 5/2010 | Schmid | 345/173 |
| 2010/0149110 A1* | 6/2010 | Gray | 345/173 |
| 2010/0188356 A1* | 7/2010 | Vu et al. | 345/173 |
| 2011/0012853 A1* | 1/2011 | Chang et al. | 345/173 |
| 2011/0090167 A1* | 4/2011 | Harris | 345/173 |
| 2011/0248932 A1* | 10/2011 | Wu et al. | 345/173 |
| 2012/0007813 A1* | 1/2012 | Chae et al. | 345/173 |

FOREIGN PATENT DOCUMENTS

| | | |
|---|---|---|
| CN | 101916142 | 12/2010 |
| EP | 2264576 | 12/2010 |
| JP | 09325852 | 12/1997 |
| JP | 2006145413 | 6/2006 |
| JP | 2010015262 | 1/2010 |
| JP | 2010505157 | 2/2010 |
| JP | 2010055260 | 3/2010 |
| KR | 20080109655 | 12/2008 |
| TW | 200921490 | 5/2009 |
| TW | 201033878 | 9/2010 |
| WO | 2009023880 | 2/2009 |

* cited by examiner

*Primary Examiner* — Charles Hicks
*Assistant Examiner* — Nguyen H Truong
(74) *Attorney, Agent, or Firm* — Gokalp Bayramoglu (57) ABSTRACT

A touch point detecting device is provided. The touch point detecting device comprises a plurality of electrodes and a scanning unit connected to said electrodes and scanning said electrodes with at least two variable excitation signal frequencies. A touch point detecting method is also provided. By means of the touch point detecting device, the electrode border as well as the integrated circuit package of the processor is reduced without reducing the detection accuracy of touch points.

20 Claims, 6 Drawing Sheets

TOUCH POINT DETECTING DEVICE AND THE TOUCH POINT DETECTING METHOD THEREOF

BACKGROUND OF THE INVENTION

This application claims the benefit of People's Republic of China Application No. 201110152534.2, filed May 28, 2011.

FIELD OF THE INVENTION

The invention relates to the touch points detecting technology, especially to a touch points detecting device and the detecting method thereof.

DESCRIPTION OF THE RELATED ART

The technology of inputting data into electronic devices by touching is widely used. These electronic devices usually adopt the touch points detecting device to sense the touch action and generate relative electric signals for the subsequent operation. The touch points detecting device used in actual use usually is presented in the form of touch panels and touch screens.

According to the different touch point detecting principles, the touch points detecting device could be classified into resistive-type, capacitive-type, optical-type, electromagnetic-type, acoustic-type etc. The working principle of a capacitive touch points detecting device is that the user uses conductive touch objects such as fingers or a stylus to touch the surface of the device leading to capacitance changes at the touch points on the device surface; the processor detects the coordinates of the touch points in accordance with the capacitance changes.

Figure 1:
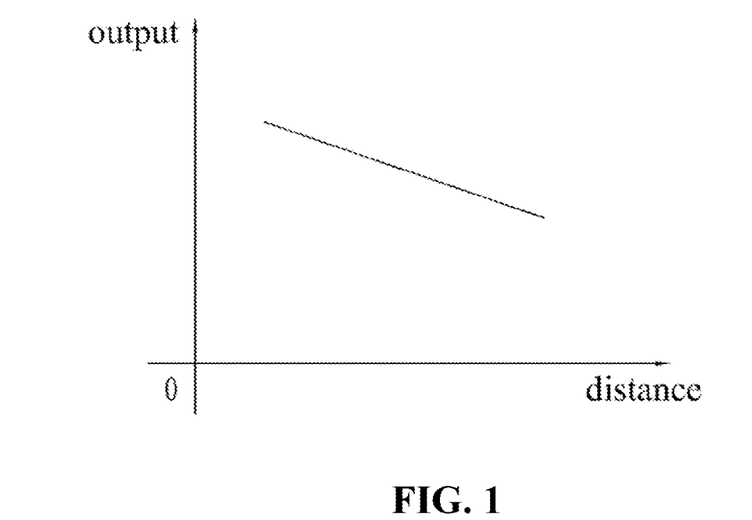
FIG. 1 is a schematic diagram of the curves concerning the variation relation between the output value of the scanned electrodes and the distance of the end providing the excitation signals from the touch position.

In order to cooperate with the different electronic devices, various capacitive touch points detecting devices are developed, such as the projective capacitive touch points detecting device. The electrodes of the projective capacitive touch points detecting device include the lattice electrodes and the single axial electrodes. As far as the single axial electrodes are concerned, as each electrode has resistance, the excitation signals passing through electrodes will be attenuated coupled with the corresponding changes of the output values generated on the electrodes. As shown in FIG. 1, certain variation relation exists between the output value of each scanned electrode and the distance of the end providing excitation signals. Therefore, the position of the touch point on the electrodes can be determined based on the available variation relation.

Figure 2:
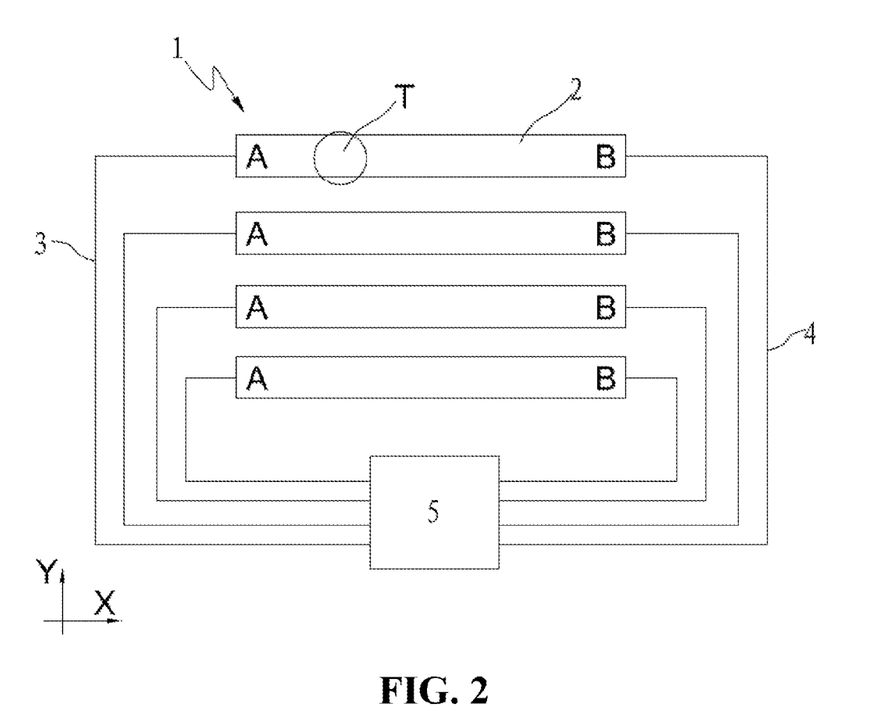
FIG. 2 is a structural schematic view of the touch point detecting device possessing the conventional dual-routing type.
Figure 3:
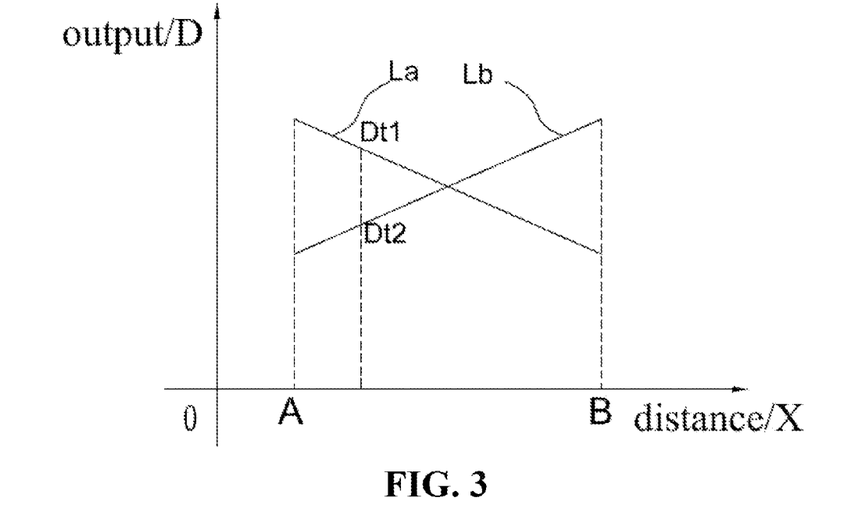
FIG. 3 is the schematic diagram of the curves concerning the variation relation between the output values for the electrodes of the detection device and the distance of the touch point from the end A of FIG. 2.

If the excitation signals are only provided from one end of electrodes, which is called single-routing type, it will cause different output values generated for the same touch point position or the same output value generated for different touch point positions, which will further cause errors when detecting the touch point position with different size touch area by touch objects. Therefore, in order to reduce the influence caused by the touch area on detecting the touch point position, excitation signals are provided separately from both ends of electrodes, called the dual-routing type. As shown in FIG. 2, the touch point detecting device 1, with the single axial electrode possessing the conventional dual-routing type, includes the electrodes 2, the conductive lines 3 and 4, the processor 5, wherein the electrodes 2 have both ends A and B. The end A of the electrodes 2 is connected to the processor 5 with the conductive lines 3, and the end B of the electrodes 2 is connected to the processor 5 with the conductive lines 4. As shown in FIG. 3, when the end A is scanned, the curve of the variation relations between the output values and the distance of the touch position from the end A is defined as La; when the end B is scanned, the curve of the variation relation between the output value and the distance of the touch position also from the end A is defined as Lb. Therefore, by using the relation between the two variable curves La and Lb, two output values Dt1 and Dt2 can be obtained at the same touch position T which can be calculated in accordance with the two output values.

In view of the dual-routing touch point detecting device, each electrode needs two conductive lines, as a result of which larger insulating area is required in the surrounding of the electrodes to lay two conductive lines connecting the electrode. In addition, when integrated with the small-size device such as the portable electronic device, the touch point detecting device will be confined. Moreover, as far as the processor is concerned, the more the conductive lines, the more output/input ports (I/O pins) will need to be provided. Therefore, the processor would need a larger integrated circuit package.

SUMMARY OF THE INVENTION

An objective of the present invention is to provide a touch point detecting device to reduce the electrode border as well as the integrated circuit package of the processor without reducing the detection accuracy of touch points.

The touch point detecting device comprises a plurality of electrodes and a scanning unit connected to said electrodes and scanning said electrodes with at least two variable excitation signal frequencies.

Another objective of the present invention is to provide a touch point detecting method.

The touch point detecting method comprises: (a) scanning said electrodes with at least two variable excitation signal frequencies to detect output values generated on said electrodes where at least one touch points occur; and (b) calculating output value differences of said output values to detect positions of said touch points on said electrodes.

By adopting the touch point detecting device and the detecting method thereof, the smaller electrode border and the smaller integrated circuit package can be provided at the same time of keeping the relatively high accuracy of the touch point detection so as to favorably realize the integration with small-size devices and reduce the wastage of the production materials and other production costs.

BRIEF DESCRIPTION OF THE DRAWINGS

The skilled artisan will understand that the drawings, described below, are for illustration purposes only. The drawings are not intended to limit the scope of the present teachings in any way. Like reference numerals designate corresponding parts throughout the several views.

DETAILED DESCRIPTION OF THE EMBODIMENTS

Figure 4:
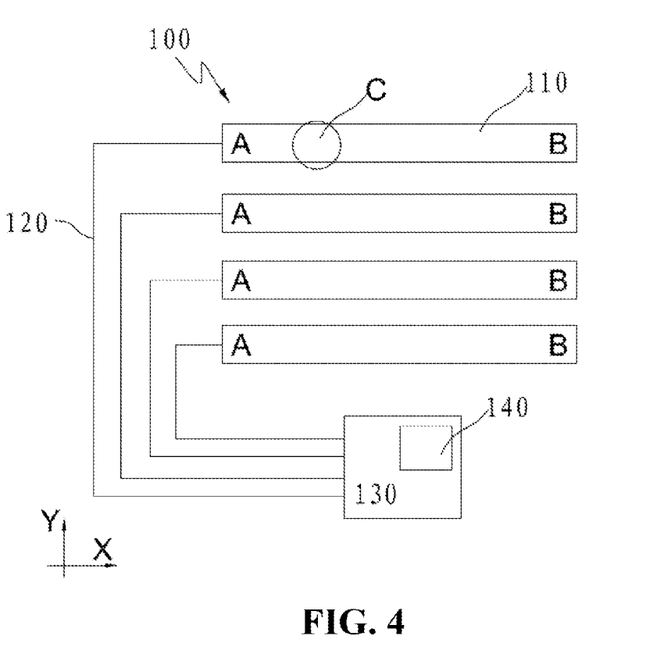
FIG. 4 is the planar structural schematic diagram of the first embodiment of the touch point detecting device of the present invention.

As shown in FIG. 4, the touch point detecting device 100 of the first embodiment of the present invention includes a plurality of electrodes 110 with the first end A and the second end B, a plurality of conductive lines 120 and a processor 130. The electrodes 110 extend along the same direction named the first direction X, and are arranged in parallel along the second direction Y. The first end A of each electrode 110 is connected to the processor 130 with the conductive line 120. The touch point detecting device 100 also includes the scanning unit 140 connected to the first end A of each electrode 110, which can be used to provide at least two variable excitation signal frequencies to the electrode 110 for scanning. According to the different circuit design requirement, the scanning unit 140 can be set within the processor 130 to form an overall component and also devised solely as an individual component separated from the processor 130 which means that the scanning unit 140 is set outside the processor 130, both being electrically connected by the conductive line or other electrical connection ways (not shown).

Figure 5:
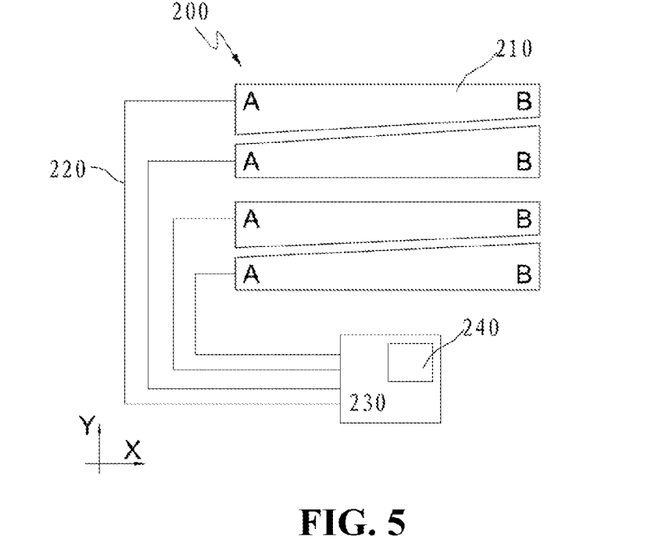
FIG. 5 is the planar structural schematic diagram of the second embodiment of the touch point detecting device of the present invention.

The shape of the electrode 110 is not limited into the strip shown in FIG. ° 4, also includes other irregular geometrical shapes like polygons. The electrode 210 of the touch point detecting device 200 in the second embodiment shown in FIG. 5 is trapezium.

Figure 6:
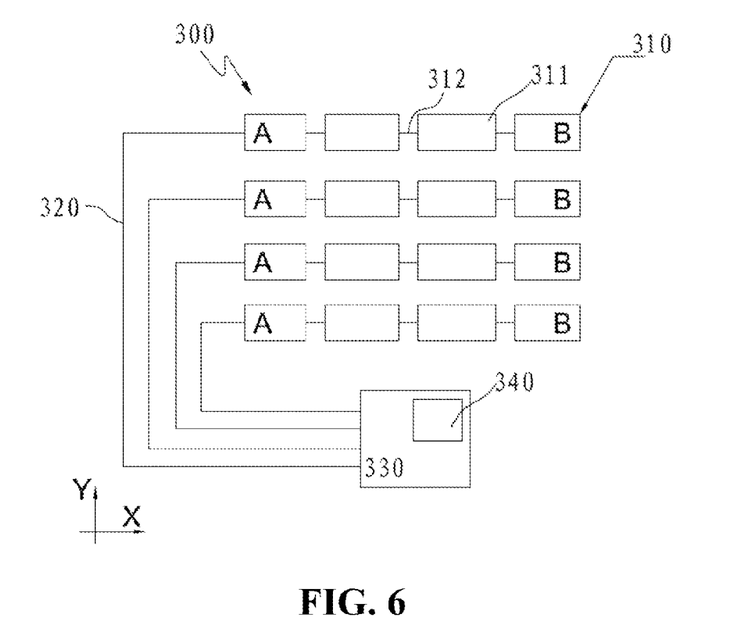
FIG. 6 is the planar structural schematic diagram of the third embodiment of the touch point detecting device of the present invention.

As shown in FIG. 6, the touch point detecting device 300 of the third embodiment, similar to the touch point detecting device 100 of the first embodiment, includes a plurality of electrodes 310 having the first end A and the second end B, the conductive lines 320, the processor 330 and the scanning unit 340. The difference is that each electrode 310 includes a plurality of conductive units 311 and a plurality of conductive lines 312. The conductive units 311 are separated mutually and connected by the conductive lines 312. The layout of other components of the touch point detecting device 300 in the third embodiment is same as that of the touch point detecting device 100 in first embodiment.

Figure 7:
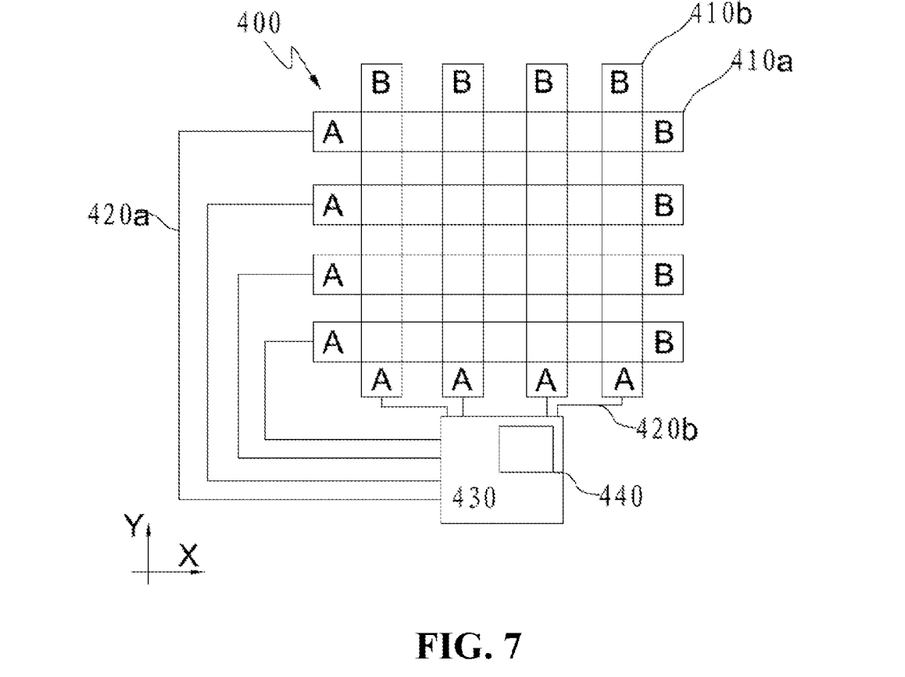
FIG. 7 is the planar structural schematic diagram of the fourth embodiment of the touch point detecting device of the present invention.

As shown in FIG. 7, the difference between the touch point detecting device 400 of the fourth embodiment and the touch point detecting device 100 of the first embodiment is that a plurality of electrodes 410 can be divided into the first electrodes 410a along the first direction X and the second electrodes 410b along the second direction Y, wherein the first electrodes 410a are connected to a processor 430 with the first conductive lines 420a, the second electrodes 410b are connected to the processor 430 with the second conductive lines 420b.

According to different actual design requirement, the electrodes of the touch point detecting device of the present invention can be made of transparent materials such as indium tin oxides and also made of opaque materials such as metal. For example, when electrodes are opaque, they can be used as the touch pad of the electronic devices like notebook computers etc; when electrodes are transparent, they can be installed on the surface of light emitting display devices like monitors to form the touch screen.

The number of electrodes in the touch point detecting device of the present invention is at least two, wherein the electrode number can be determined by the size and the resolution of the touch point detecting device. Generally, the higher the resolution, the smaller the pixel required, which means the higher electrode number; the bigger the size of the touch point detecting device is, the more the electrode number is. Moreover, the first direction X and the direction Y are intersected with each other.

Taking the touch point detecting device of the first embodiment as an example, as shown in FIG. 4, the touch point detecting device 100 must be calibrated before detection, the output values generated by scanning the first end A and the second end B of the electrode 110 with variable excitation signal frequencies are defined and recorded as the baseline output values of detecting the touch point position. First of all, the touch object is contacted with the first end A of any one electrode 110, which means that the touch point is at the first end A; the scanning unit 140 scans the electrode 110 with the first excitation signal frequency f1; the processor 130 detects and records the first baseline output value Da1; and then the electrode 110 is scanned with the second excitation signal frequency f2 (f2<f1); the processor 130 detects and records the baseline output value Da2; and then the processor 130 calculates the first baseline output value difference Da=Da1−Da2 at the first end A according to two baseline output values Da1 and Da2. In the same manner, the electrode 110 is scanned respectively with the same the first excitation signal frequency f1 and the second excitation signal frequency f2 mentioned above via the contact of the same touch object with the same electrode 110; the processor 130 respectively gets the baseline output values Db1 and Db2 to proceed for calculating the second baseline output value difference Db=Db1−Db2 at the second end B. In accordance with the detected baseline output values Da1, Da2, Db1 and Db2 when the first end A and the second end B of the electrode 110 are scanned with the first excitation signal frequency f1 and the second excitation signal frequency f2, the curves of the variation relation L1 and L2 of output value of the electrode and the distance of the touch point from the first end A can be drawn as shown in FIG. 8.

Figure 9:
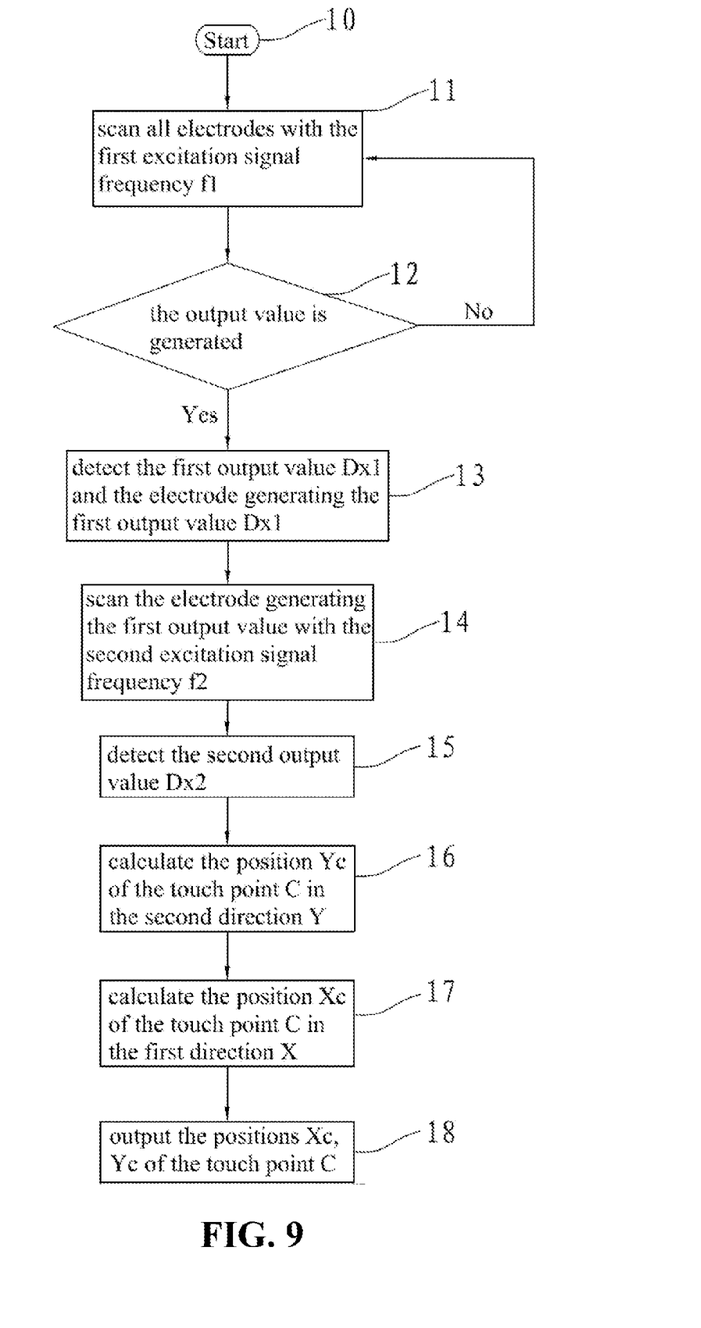
FIG. 9 is the flowchart of the first embodiment of the method of detecting a touch point of the present invention.

When the touch point C occurs on the surface of the touch point detecting device as shown in FIG. 4, the position of the touch point C can be detected in the flowing process of the first embodiment of the touch point detecting method as shown in FIG. 9. After starting the initial step 10, in the step 11, the scanning unit 140 scans all electrodes 110 with the first excitation signal frequency f1, wherein the scanning unit 140 can scan all electrodes 110 one at a time (sequentially or in any order) or synchronously. In the step 12, the processor 130 determines whether the output value is generated, if not, the process then returns to the step 11; if yes, the process flows to the step 13. In step 13, the processer detects the first output value Dx1 and the electrode 110 generating the first output value Dx1.

In the step 14, the scanning unit 140 scans the electrode 110 generating the first output value in the step 13 with the second excitation signal frequency f2. In the step 15, the processor 130 detects the second output value Dx2 generated by the electrode 110. In the step 16, the processor 130 calculates the position Yc of the touch point C in the second direction Y by means of interpolation.

Figure 8:
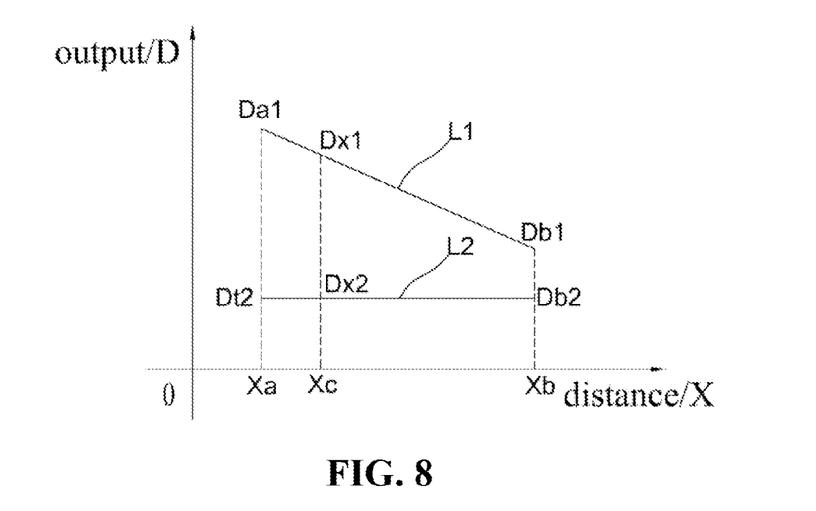
FIG. 8 is the schematic diagram of the curves concerning the variation relation between the output value and the distance of the touch point from the end A while scanning the same electrode with two different frequency excitation signals.

In the step 17, the processor 130 calculates the output value difference Dx=Dx1−Dx2 in accordance with the first output value Dx1 detected in the step 13 and the second output value Dx2 detected in the step 15; as shown in FIG. 8, the baseline output value differences Da, Db, the output value difference Dx of the touch point C and the distance between the first end A and the second end B form the proportional relation. If the position Xa of the first end A is defined as the origin of coordinate named Xa=0, the distance of the second end B from the first end A is defined as Xb. Therefore, according to the baseline output value differences Da, Db of the electrode 110 pre-stored in the processor, via the formula below:

$$Xc = x_b - \frac{(D_x - D_b)}{(D_a - D_b)}(x_b)$$

To calculate the distance Xc of the touch point U on the electrode 110 from the first end A, which means the position of the touch point C in the first direction X. In the step 18, the processor 130 outputs the positions Xc, Ye of the touch point C in the first direction X and in the second direction Y.

Figure 10:
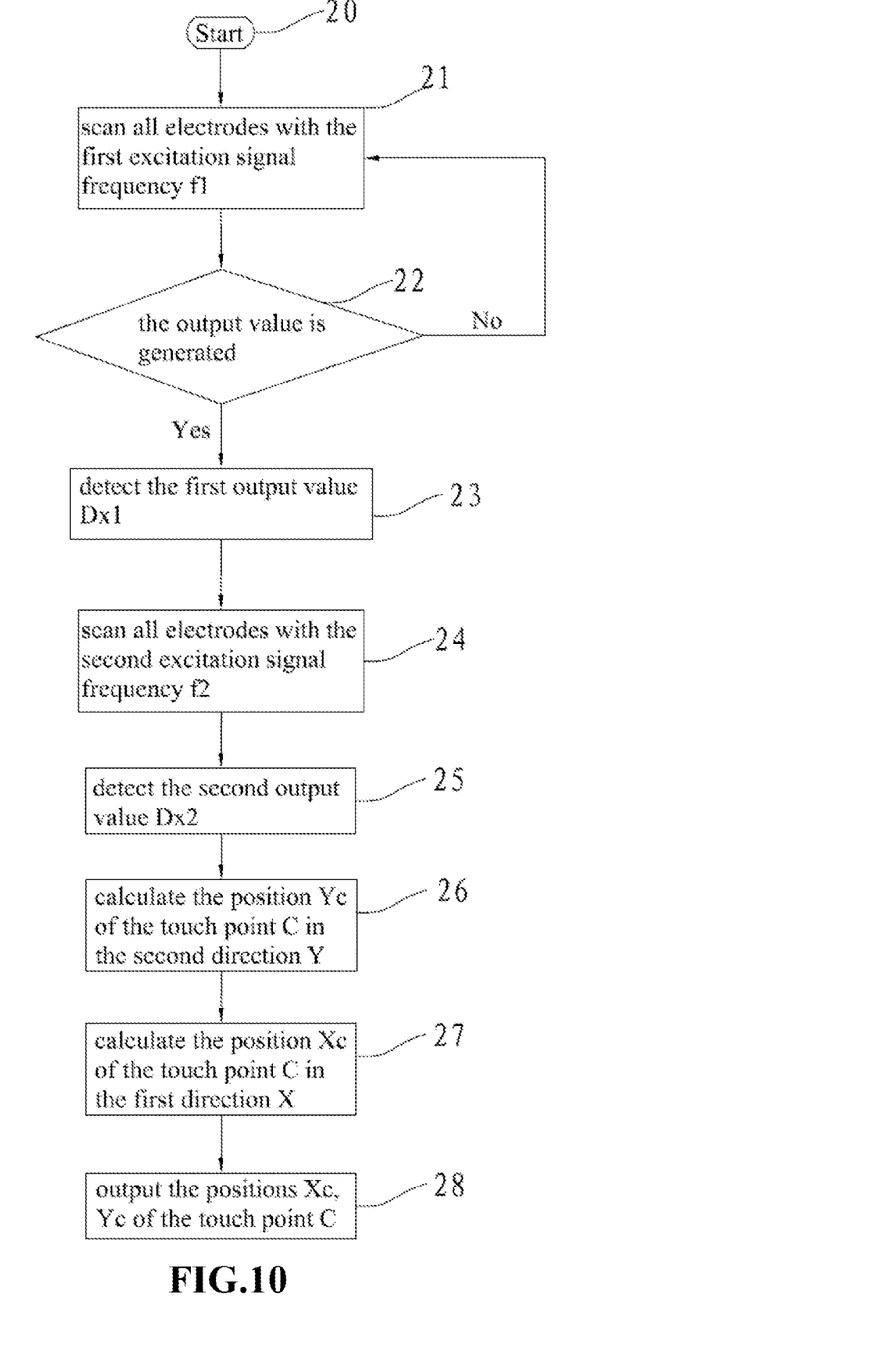
FIG. 10 is the flowchart of the second embodiment of the method of detecting a touch point of the present invention.

According to the design requirement of different scanning methods, the touch point occurring on the surface of the touch point detecting device of the present invention can be detected by the flowing process of the second embodiment of the touch point detecting method shown in FIG. 10, which is essentially similar to the first embodiment of the touch point detecting method. The difference is that it is not necessary to detect the electrode 110 generating output values in the step 23. Therefore, when executing the step 24, the scanning unit 140 scans all the electrodes 110 with the second excitation signal frequency f2.

The above two variable excitation signal frequencies can be matched randomly, such as f1=1.2 MHz, and f2=380 kHz. In order to match different accuracy for detecting touch point, two or more variable excitation signal frequencies can be adopted for scanning the electrodes 110 respectively to calculate the average value of the touch point position Xc in the first direction.

The above processor includes the storage unit, the receiving unit, the calculating unit and the output unit. The storage unit is used to store the baseline output value differences Da and Db as well as the curves of the variation relation L1 and L2 of output value on the electrode and the distance of the touch point from the first end A; the receiving unit receive the output values generated by scanning the electrodes; The calculating unit performs the role of calculating the baseline output value differences Da, Db of the electrode, the output value difference Dx and the positions Xc, Yc of the touch point C. The results, such as the positions Xc, Yc of the touch point C, are being output to subsequent operation by the outputting unit.

The fourth embodiment of the touch point detecting device is regarded as two intersecting and overlapping electrode layers of the first embodiment. Therefore, the touch point detecting method mentioned above is implemented on the first electrodes 410a along the first direction X to calculate the position Xc of the touch point on the first electrodes 410a, while the touch point detecting method is implemented on the second electrodes 410b along the second direction Y to calculate the position Yc of the touch point on the second electrodes 410b.

Because the touch points generated on each electrode can be calculated separately by means of the mentioned touch point detecting method, when two or more touch points appear synchronously on the surface of the touch point detecting device and not on the same electrode, the position of each touch point can be detected by means of the touch point detecting method of the present invention.

While certain embodiments have been shown and described, various modifications and substitutions may be made thereto without departing from the spirit and scope of the invention. Therefore, it is to be understood that the present invention has been described by way of illustration and not limitations.

What is claimed is:

1. A touch point detecting device, comprising:
   a plurality of electrodes;
   a scanning unit connected to said electrodes and configured to scan at least one of said electrodes with at least two variable excitation signal frequencies; and
   a processor configured to calculate a first baseline output value difference and a second baseline output value difference in a calibration step, to detect at least two variable output values generated on said corresponding electrode where at least one touch point occurs, to calculate an output value difference of said at least two corresponding output values when said at least one touch point occurs, and to calculate a distance between said at least one touch point and one of a first end or a second end of said electrode where said at least one touch point occurs according to said at least two variable output values;
   wherein the scanning unit is configured to scan each of said electrodes with said at least two variable excitation signal frequencies under the circumstances that said at least one touch point occurs at the first end of said electrode and occurs at the second end of said electrode, respectively, in the calibration step,
   wherein the processor is configured to further detect at least two variable output values generated on the first end of said corresponding electrode and detects at least two variable output values generated on the second end of said corresponding electrode in the calibration step, and
   wherein the first baseline output value difference is calculated according to said at least two corresponding variable output values occurred at the first end of said electrode, whereas the second baseline output value difference is calculated according to said at least two corresponding variable output values occurred at the second end of said electrode.

2. The touch point detecting device of claim 1, wherein said electrodes are disposed in a first direction.

3. The touch point detecting device of claim 1, wherein said electrodes comprise a plurality of first electrodes disposed in a first direction and a plurality of second electrodes disposed in a second direction.

4. The touch point detecting device of claim 3, wherein said first direction intersects with said second direction.

5. The touch point detecting device of claim 1, wherein said electrodes are polygon.

6. The touch point detecting device of claim 1, wherein said electrodes comprise a plurality of separated conductive units and a plurality of conductive lines connecting said conductive units.

7. The touch point detecting device of claim 1, wherein said scanning unit is set within said processor.

8. The touch point detecting device of claim 1, wherein said scanning unit is set outside said processor.

9. The touch point detecting device of claim 1, wherein said electrodes are made of transparent conductive material.

10. The touch point detecting device of claim 1, wherein said electrodes are made of metal.

11. The touch point detecting device of claim 1, wherein the electrodes extend along a first direction, and are arranged in parallel along a second direction, and wherein only the first ends of the electrodes are connected to the scanning unit.

12. A touch point detecting method, comprising the steps of
 a) performing a calibration step, which comprises:
  a1) scanning each of a plurality of electrodes with at least two variable excitation signal frequencies;
  a2) detecting at least two output values generated on said corresponding electrode;
  a3) calculating a first output value difference of said corresponding output values when said at least one touch point occurs at a first end of said electrode;
  a4) recording said first output value difference from the step a3) as a first baseline output value difference;
  a5) repeating steps a1) and a2) herein;
  a6) calculating a second output value difference of said corresponding output values when said at least one touch point occurs at a second end of said corresponding electrode; and
  a7) recording said second output value difference from the step a6) as a second baseline output value difference;
 b) scanning at least one of said electrodes with said at least two variable excitation signal frequencies;
 c) detecting at least two output values generated on said corresponding electrode where at least one touch point occurs;
 d) calculating a third output value difference of said at least two corresponding output values when said at least one touch point occurs;
 e) calculating a distance between said at least one touch point and one of the first end and the second end of said electrode where said at least one touch point occurs according to said at least two variable output values; and
 f) outputting a position of said at least one touch point.

13. The touch point detecting method of claim 12, wherein said step b) and step c) further comprise:
 b1) scanning said electrodes with a first excitation signal frequency of said at least two variable excitation signal frequencies;
 c1) detecting a first output value generated on said electrode where said at least one touch point occurs;
 c2) detecting said electrode generating said first output value;
 b2) scanning said electrode generating said first output value with a second excitation signal frequency of said at least two variable excitation signal frequencies; and
 c3) detecting a second output value.

14. The touch point detecting method of claim 12, wherein said step b) and step c) further comprise:
 b1) scanning said electrodes with a first excitation signal frequency of said at least two variable excitation signal frequencies;
 c1) detecting a first output value generated on said electrode where said at least one touch point occurs;
 b2) scanning said electrode with a second excitation signal frequency of said at least two variable excitation signal frequencies; and
 c2) detecting a second output value generated on said electrode where said at least one touch point occurs.

15. The touch point detecting method of claim 13 or 14, wherein said electrodes are scanned one at a time.

16. The touch point detecting method of claim 13 or 14, wherein said electrodes are scanned synchronously.

17. The touch point detecting method of claim 12, wherein the step e) is to calculate said position of said at least one touch point on said electrode in a first direction.

18. The touch point detecting method of claim 12, wherein in the step e), the distance is calculated based on a proportional relation formed by said third output value difference, said first baseline output value difference and said second, baseline output value difference and a distance between the first end and the second end of the detected electrode.

19. The touch point detecting method of claim 12, wherein before the step f), the method further comprises the step of calculating said position of said at least one touch point on said electrode in a second direction according to said third output value difference, said first baseline output value difference and said second, baseline output value difference.

20. The touch point detecting method of claim 19, wherein said position of said at least one touch point on said electrode in the second direction is calculated by a means of interpolation.

* * * * *